F. OLDHAM.
SPRAYING AND POWDER DUSTING ATTACHMENT.
APPLICATION FILED NOV. 23, 1915.

1,218,953.

Patented Mar. 13, 1917.
2 SHEETS—SHEET 1.

INVENTOR
FRANK OLDHAM

BY
ATTORNEY

F. OLDHAM.
SPRAYING AND POWDER DUSTING ATTACHMENT.
APPLICATION FILED NOV. 23, 1915.

1,218,953.

Patented Mar. 13, 1917.
2 SHEETS—SHEET 2.

INVENTOR
FRANK OLDHAM.
BY
ATTORNEY

UNITED STATES PATENT OFFICE.

FRANK OLDHAM, OF DALLAS, TEXAS.

SPRAYING AND POWDER-DUSTING ATTACHMENT.

1,218,953.
Specification of Letters Patent. Patented Mar. 13, 1917.

Application filed November 23, 1915. Serial No. 63,114.

*To all whom it may concern:*

Be it known that I, FRANK OLDHAM, citizen of the United States, residing at Dallas, in the county of Dallas and State of Texas, have invented certain new and useful Improvements in Spraying and Powder-Dusting Attachments, of which the following is a specification.

This invention pertains to new and useful improvements in spraying and dusting attachments for cultivators.

The object of the invention is to provide means for spraying plants in advance of dusting them with an insecticide whereby the plants are sufficiently moistened to cause the insecticide to adhere thereto.

A further object is to arrange the spraying and dusting means as an attachment which may be readily placed on an ordinary cultivator or other wheel supported frame and removed when desired.

Among other objects are the provision of means for vertically adjusting the dusting means in accordance with the height of the means in accordance with the height of the plants; means for adjusting the spraying device either simultaneously with or independently of the dusting means; and a common driving unit for each set of spraying and dusting devices.

A still further object of the invention is to provide a device of the character described that will be strong, durable, efficient and simple in construction, also one in which the several parts of the devices will not be likely to get out of working order.

Figure 1:
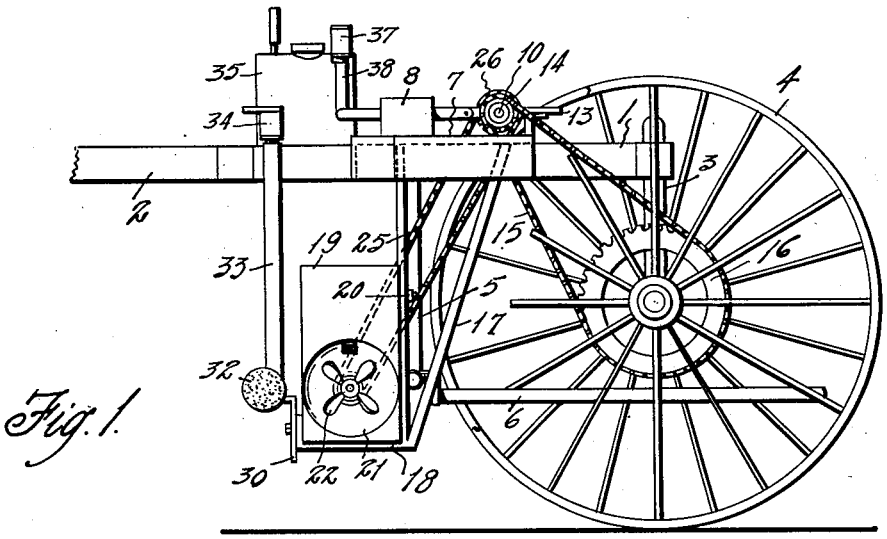
Figure 2:
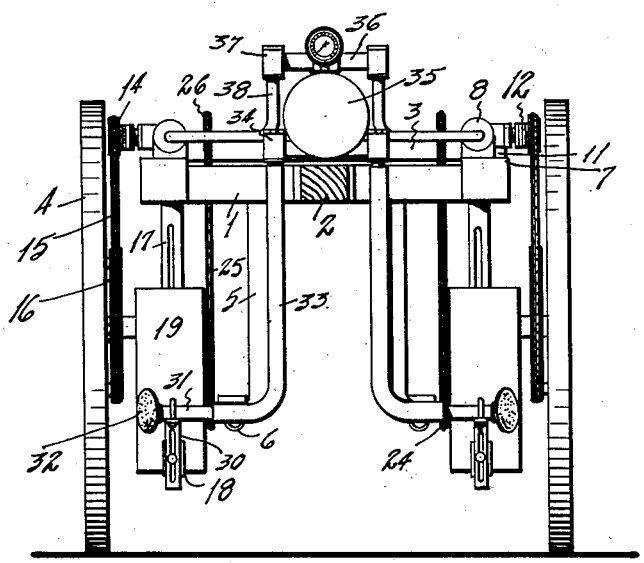
Figure 3:
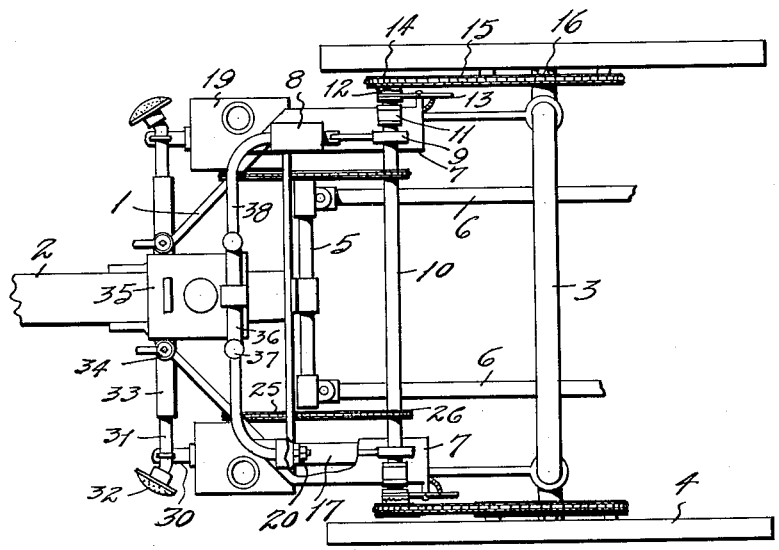
Figure 4:
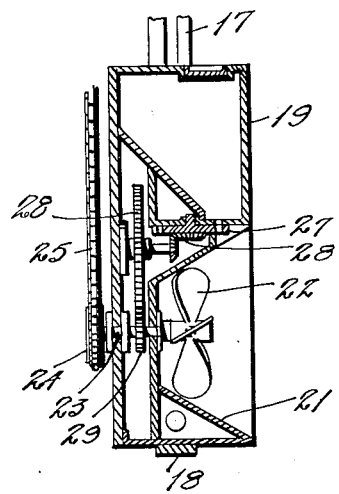

With the above and other objects in view the invention has relation to certain novel features of construction and operation, an example of which is described in the following specification and illustrated in the accompanying drawings, wherein:

Figure 1 is a partial side elevation of a cultivator equipped with my spraying and dusting attachment, Fig. 2 is a front elevation of the same, Fig. 3 is a plan view of the parts shown in Fig. 1, and Fig. 4 is a vertical sectional view of the dusting hopper and component parts.

In the drawings the numeral 1 designates the frame of an ordinary cultivator, 2 the tongue, 3 the arch axle and 4, the ground wheels supporting the axle. Gangs 6 of the usual type are hinged to the arch-yoke 5 which is suspended from the frame. The details of construction of the cultivator have not been shown, but merely the main parts have been illustrated.

In carrying out the invention I propose to use certain elements of the construction shown in the Letters Patent issued to me for spraying attachment for cultivators on October 12th, 1915, Number 1,156,622, although the present construction is somewhat different.

On each side of the frame 1 a flanged base plate 7 is mounted and as the construction of one side is duplicated on the other side, a description of one will do for both. An air compressing cylinder 8 is mounted on the forward end of the plate and is driven by an eccentric 9 mounted on a drive shaft 10 extending transversely of the frame 1. The shaft is supported in brackets 11 fastened on the plates. A sprocket wheel 14 is loosely confined on the end of the shaft and has a clutch hub which is engaged by a clutch collar 12 splined on the shaft and shifted by a lever 13 as shown in detail in the Letters Patent above referred to. The sprocket wheel 14 is driven by a chain 15 which passed about a large sprocket 16 attached to the spokes of the ground wheels 4. The chain being of the detachable link type may be quickly shortened or lengthened as is the common practice. If the chain should sag a common belt tightener (not shown) may be installed.

From the underside of the plate a hanger 17 depends and has a forwardly extending seat 18. A powder dusting hopper 19 is mounted to slide vertically on the hanger and to rest in the seat when in its lowermost position. A nut 20 is provided for fastening the hopper in its adjusted position. It is obvious that the plate 7 and hanger 17 may be formed as a unit and bolted on the frame 1.

The hopper 19 has at its lower portion a flaring fan casing 21 directed toward the outer side of the cultivator. In this casing a fan 22 is mounted on a shaft 23 as shown best in Fig. 4. The shaft 23 is driven by a sprocket wheel 24 which in turn is driven by a chain 25 running from a sprocket wheel 26 fixed on the shaft 10. Over the fan casing a rotating dropping plate 27 of suitable construction is mounted on the bottom of the powder reservoir and arranged so that when rotated powder will be dropped into the casing in front of the fan. The plate 27 is rotated by a train of gears 28 driven from a pinion 29 mounted on the shaft 23 as shown in Fig. 4. It is obvious that powder dropped in front of the rapidly revolving fan 22 will be blown out of the casing 21 and effectually dusted over the plants as the cultivator is drawn down a row.

In dusting plants with powder the operation has generally been performed early in the morning because the plants being wet with dew retained the powder which adhered thereto. I propose to cause the powder to adhere to the plants irrespective of the time of day the work is done. On the front end of the seat 18 an angular bracket 30 is adjustably mounted and has its upper portion directed forwardly. A nozzle pipe 31 is secured on this bracket horizontally with its outer end bent forward as shown in Fig. 3. A spray nozzle 32 is mounted on the forward end of the pipe 31. The inner end of pipe is inserted in a hose 33 which hangs from a controlling valve 34 connected with a tank 35 mounted on the tongue 2. The hose permits the spray nozzle to be adjusted vertically and the bracket 30 provides a vertical adjustment independent of the hopper 19.

Water or any other liquid may be placed in the tank and put under pressure by the compressors 8 which are connected with the tank by means of pipes 38 and 36 between which a check valve 37 is disposed. The spray nozzles being set in advance of the hoppers 19 it is apparent that as the cultivator is drawn along a row of plants, the plants of the rows on each side will first be sprayed with a liquid and then dusted with a powder or insecticide which will destroy all vermin. No powder will be lost as the plants being moistened, all powder dusted will adhere thereto.

It is apparent that the spraying and dusting attachment may be adjusted as desired. The plates 7 together with the shaft 10 constitute a unit drive which may be readily attached to a cultivator.

The invention is presented as including all such modifications and changes as properly come within the scope of the appended claims.

What I claim, is:

1. In a spraying and powder dusting attachment, a base plate adapted to be mounted on a wheel supported frame of a cultivator, an air compressor mounted on the plate, a liquid tank connected with the air compressor, a hanger carried by the plate, a powder dusting hopper carried by the hanger and having provision for dusting powder, and a nozzle carried in advance of the hopper and connected with the tank.

2. In a spraying and powder dusting attachment, a base plate constructed to be attached to a wheel supported frame, an air compressor mounted on the plate, a driving element mounted on the plate and having operative connection with the air compressor, a hanger depending from the plate, a powder hopper vertically adjustable on the hanger, a fan mounted in juxtaposition to the hopper and having driven connection with the driving element, a bracket mounted on the hanger in advance of the hopper, a nozzle mounted on the bracket, a tank, a flexible connection between the tank and the nozzle, a connection between the air compressor and the tank, and means for imparting motion to the driving element.

In testimony whereof I affix my signature.

FRANK OLDHAM.